US012179189B2

(12) United States Patent
Ito et al.

(10) Patent No.: US 12,179,189 B2
(45) Date of Patent: Dec. 31, 2024

(54) FILM FOR MICROFLUIDIC DEVICE, MICROFLUIDIC DEVICE AND METHOD FOR MANUFACTURING SAME

(71) Applicant: Solventum Intellectual Properties Company, Maplewood, MN (US)

(72) Inventors: Takeshi Ito, Sagamihara (JP); Yasushi Ebihara, Tokyo (JP); Naota Sugiyama, Yokohama (JP)

(73) Assignee: Solventum Intellectual Properties Company, Maplewood, MN (US)

( * ) Notice: Subject to any disclaimer, the term of this patent is extended or adjusted under 35 U.S.C. 154(b) by 718 days.

(21) Appl. No.: 17/415,988

(22) PCT Filed: Dec. 20, 2019

(86) PCT No.: PCT/IB2019/061228

§ 371 (c)(1),
(2) Date: Jun. 18, 2021

(87) PCT Pub. No.: WO2020/136535

PCT Pub. Date: Jul. 2, 2020

(65) Prior Publication Data

US 2021/0379586 A1 Dec. 9, 2021

(30) Foreign Application Priority Data

Dec. 26, 2018 (JP) ................................ 2018-243461

(51) Int. Cl.
*B01L 3/00* (2006.01)
*B01F 23/00* (2022.01)
(Continued)

(52) U.S. Cl.
CPC ..... *B01L 3/502707* (2013.01); *B01L 2200/12* (2013.01); *B01L 2300/12* (2013.01); *B01L 2300/161* (2013.01); *B01L 2300/168* (2013.01)

(58) Field of Classification Search
CPC .......... B01L 3/502707; B01L 2200/12; B01L 2300/12; B01L 2300/161; B01L 2300/168; B01L 2200/0689; B01L 2300/0887
See application file for complete search history.

(56) References Cited

U.S. PATENT DOCUMENTS

2002/0001718 A1* 1/2002 Veerasamy ............ B05D 5/083 428/408
2005/0230767 A1* 10/2005 Park ..................... B81B 7/0061 438/51
(Continued)

FOREIGN PATENT DOCUMENTS

JP 2005-257283 9/2005
WO WO 2008-065868 6/2008
(Continued)

OTHER PUBLICATIONS

Suzuki, "Verification of a Model for Estimating the Void Fraction in a Three-Component Randomly Packed Bed", Powder Technology, Jul. 1985, vol. 43, No. 2, pp. 147-153.
(Continued)

*Primary Examiner* — Jennifer Wecker
*Assistant Examiner* — Oyeleye Alexander Alabi
(74) *Attorney, Agent, or Firm* — Vorys, Sater, Seymour and Pease LLP

(57) ABSTRACT

A film for a microfluidic device is capable of bonding to a polydimethylsiloxane substrate having flow channels formed in a surface thereof, and also exhibiting stable hydrophilicity even under high temperature and high humidity conditions and having scratch resistance. When the film can be used as a microfluidic device, the film is bonded to a polydimethylsiloxane substrate having flow channels formed in a surface thereof to form a liquid-tight flow channels. The film including a base material and a hydro-
(Continued)

philic coating, wherein the hydrophilic coating includes a (meth)acrylic resin and from 65 to 95 mass % of unmodified nanosilica particles based on a total mass of the hydrophilic coating.

19 Claims, 1 Drawing Sheet

(51) Int. Cl.

| | |
|---|---|
| ***B01F 23/41*** | (2022.01) |
| ***B01F 101/23*** | (2022.01) |
| ***B23Q 17/24*** | (2006.01) |
| ***C07K 14/705*** | (2006.01) |
| ***C12M 1/34*** | (2006.01) |
| ***C12Q 1/04*** | (2006.01) |
| ***C12Q 1/18*** | (2006.01) |
| ***C12Q 1/686*** | (2018.01) |
| ***G01N 21/3577*** | (2014.01) |
| ***G01N 21/359*** | (2014.01) |
| ***G01N 21/39*** | (2006.01) |
| ***G01N 21/45*** | (2006.01) |
| ***G01N 21/64*** | (2006.01) |
| ***G01N 27/414*** | (2006.01) |
| ***G01N 30/12*** | (2006.01) |
| ***G01N 30/68*** | (2006.01) |
| ***G01N 30/70*** | (2006.01) |
| ***G01N 30/72*** | (2006.01) |
| ***G01N 30/88*** | (2006.01) |
| ***G01N 33/00*** | (2006.01) |
| ***G01N 33/18*** | (2006.01) |
| ***G01N 33/50*** | (2006.01) |
| ***G01N 33/53*** | (2006.01) |
| ***G01N 33/543*** | (2006.01) |
| ***G01N 33/68*** | (2006.01) |
| ***G01N 33/74*** | (2006.01) |
| ***H10K 10/46*** | (2023.01) |
| ***H10K 85/00*** | (2023.01) |
| ***H10K 85/20*** | (2023.01) |

(56) References Cited

U.S. PATENT DOCUMENTS

| | | | | |
|---|---|---|---|---|
| 2011/0287244 | A1* | 11/2011 | Murayama | C09D 5/1668 428/480 |
| 2012/0205043 | A1* | 8/2012 | Kurimura | C08F 2/50 156/332 |
| 2014/0299193 | A1* | 10/2014 | Kenney | C08J 7/043 137/561 R |
| 2015/0151559 | A1* | 6/2015 | Hirayama | B41M 5/5227 428/32.34 |
| 2015/0203708 | A1 | 7/2015 | Klun | |
| 2017/0341075 | A1* | 11/2017 | Sirkis | C23C 14/5886 |

FOREIGN PATENT DOCUMENTS

| | | |
|---|---|---|
| WO | WO 2008-087800 | 7/2008 |
| WO | WO 2013-066874 | 5/2013 |
| WO | WO 2018-185590 | 10/2018 |

OTHER PUBLICATIONS

International Search Report for PCT International Application No. PCT/IB2019/061228, mailed on May 12, 2020, 5 pages.

* cited by examiner

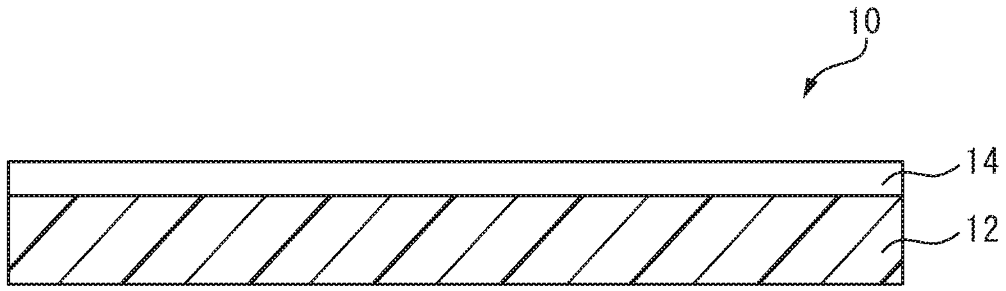
10
14
12

FILM FOR MICROFLUIDIC DEVICE, MICROFLUIDIC DEVICE AND METHOD FOR MANUFACTURING SAME

CROSS REFERENCE TO RELATED APPLICATIONS

This application is a national stage filing under 35 U.S.C. 371 of PCT/IB2019/061228, filed 20 Dec. 2019, which claims the benefit of JP Application No. 2018-243461, filed 26 Dec. 2018, the disclosures of which are incorporated by reference in their entirety herein.

The present disclosure relates to a film for a microfluidic device, a microfluidic device, and a method for manufacturing the same.

BACKGROUND ART

Hydrophilic films are widely used in microfluidic devices. Microfluidic devices are generally configured of a plurality of layers. For example, flow channels are formed in the surface of a first layer (substrate), and a second layer is bonded to the first layer so as to cover the flow channels. Polydimethylsiloxane (PDMS) materials are suitably used in the first layer from the perspectives of processability, chemical resistance, accuracy, and the like. Hydrophilic films are used in the second layer.

PDMS materials tend to be difficult to adhere to the second layer containing a surfactant for the purpose of imparting hydrophilicity. It is known that silica-deposited films are hydrophilic and can be used as a second layer for adhering to a PDMS material through a plasma treatment.

Patent Document 1 (JP 2005-257283 A) describes a "microchip containing: a polydimethylsiloxane (PDMS) substrate in which at least fine flow channels are formed, and an opposing substrate adhered to the surface of the PDMS substrate in which the fine flow channels are formed; wherein the opposing substrate is formed from a synthetic resin other than PDMS, a silicon oxide film is formed on the bonding surface of the opposing substrate, and the opposing substrate is adhered to the PDMS substrate via the silicon oxide film."

Patent Document 2 (WO 2008/087800) describes a "method for manufacturing a microchip in which flow channel grooves are formed in a surface of at least one resin substrate of two resin substrates, and the two resin substrates are bonded together with the surface in which the flow channel grooves are formed being oriented inward, the method including activating the surfaces to be bonded of each of the two resin substrates, and then bonding together the two resin substrates while applying pressure".

Patent Document 3 (WO 2008/065868) describes a method for bonding microchip substrates by forming a flow channel groove in at least one of two resin members, and then bonding together the two resin members with the surface in which the flow channel groove is formed being oriented inward, wherein an $SiO_2$ film having $SiO_2$ as a main component is formed on the surfaces to be bonded of each of the two resin members, and the $SiO_2$ film is then activated to bond the two resin members together.

SUMMARY OF THE INVENTION

The hydrophilicity of silica-deposited films is reduced under high temperature and high humidity conditions. This is disadvantageous in terms of the storage stability of the silica-deposited film or the performance assurance of the microfluidic device. In addition, the adhesiveness of the deposited silica film to another film is relatively low, and during production of the microfluidic device, when a device or apparatus such as a conveyance roller contacts the deposited silica film or the deposited silica film is immersed in water, the silica may drop off from the film, resulting in a decrease in the hydrophilicity of the film.

The present disclosure provides a film for a microfluidic device, the film being capable of bonding to a polydimethylsiloxane substrate having flow channels formed in a surface thereof, and also exhibiting stable hydrophilicity even under high temperature and high humidity conditions and having scratch resistance.

According to one embodiment, disclosed is a film for a microfluidic device. The film is bonded to a polydimethylsiloxane substrate having flow channels formed in a surface thereof to form a microfluidic device having liquid-tight flow channels therein. The film includes a base material and a hydrophilic coating. The hydrophilic coating includes a (meth)acrylic resin and from 65 to 95 mass % of unmodified nanosilica particles based on a total mass of the hydrophilic coating.

According to another embodiment, disclosed is a microfluidic device. The microfluidic device includes a polydimethylsiloxane substrate having flow channels formed in a surface thereof, and the above-mentioned film, wherein the polydimethylsiloxane substrate and the film are bonded so that the surface of the polydimethylsiloxane substrate in which the flow channels are formed faces the hydrophilic coating of the film, and liquid-tight flow channels are provided internally.

According to yet another embodiment, disclosed is a method for manufacturing a microfluidic device. The method includes: preparing a polydimethylsiloxane substrate having flow channels formed in a surface thereof; preparing the above-mentioned film; activating the surface of the polydimethylsiloxane substrate in which the flow channels are formed and the hydrophilic coating of the film; and bonding the polydimethylsiloxane substrate and the film such that the surface of the polydimethylsiloxane substrate in which the flow channels are formed faces the hydrophilic coating of the film, thereby forming liquid-tight flow channels within a microfluidic device.

According to the present disclosure, a film for a microfluidic device is provided, the film being capable of bonding to a polydimethylsiloxane substrate having flow channels formed in a surface thereof, and also exhibiting stable hydrophilicity even under high temperature and high humidity conditions and having scratch resistance.

The above descriptions should not be construed to mean that all embodiments of the present invention and all advantageous effects of the present invention are disclosed.

BRIEF DESCRIPTION OF DRAWINGS

FIG. 1 is a schematic cross-sectional view of a film for a microfluidic device according to an embodiment.

DESCRIPTION OF EMBODIMENTS

Representative embodiments of the present invention will now be described in more detail for the purpose of illustration with reference to the drawing, but the present invention is not limited to these embodiments.

In the present disclosure, "(meth)acrylic" means acrylic or methacrylic, and "(meth)acrylate" means acrylate or methacrylate.

In the present disclosure, "hydrophilic" means lower than the water contact angle of the base material or exhibits water dispersibility or water solubility.

In the present disclosure, "dispersed" means not agglomerated, and "water-dispersible" means that the nanosilica particles do not agglomerate in water. For example, when the nanosilica particles are dispersed in a transparent (meth) acrylic resin, the initial haze value of the hydrophilic coating can be set to approximately 20% or less.

In the present disclosure, "unmodified" means that the end groups, for example silanol groups (Si—OH groups), on the surface of the nanosilica particles are not modified by other materials. "Modified" refers to a process in which a surface treatment agent is bonded (covalently bonded, ionically bonded, or physically-adsorbed) to an end group on the surface of the nanosilica particles in order to facilitate dispersion of the nanosilica particles in water, (meth)acrylic resin, or the like.

The film for a microfluidic device of one embodiment is bonded to a polydimethylsiloxane substrate having flow channels formed in a surface thereof to thereby form a microfluidic device having liquid-tight flow channels therein. In the present disclosure, a "liquid-tight flow channel" means a flow channel in which liquids are not mutually communicated between one flow channel and another flow channel formed in the microfluidic device, and liquid does not flow out from an outer edge of the microfluidic device. The film includes a base material and a hydrophilic coating. The hydrophilic coating includes a (meth)acrylic resin and from 65 to 95 mass % of unmodified nanosilica particles based on a total mass of the hydrophilic coating. In the present disclosure, the "total mass of the hydrophilic coating" means the dry mass. The hydrophilic coating of the film is bonded to the polydimethylsiloxane substrate such that liquid-tight flow channels are formed inside the microfluidic device. In one embodiment, after the hydrophilic coating of the film and the polydimethylsiloxane substrate have been bonded, peeling the film from the polydimethylsiloxane substrate results in cohesive failure of the polydimethylsiloxane substrate.

The hydrophilic coating includes a high level of unmodified nanosilica particles having silanol end groups that are polar groups. As such, the proportion of unmodified nanosilica particles exposed at the surface of the hydrophilic coating can be increased, thereby imparting a high level of hydrophilicity to the hydrophilic coating and achieving an excellent bonding property with the polydimethylsiloxane substrate, which is similar in chemical properties. In addition to the unmodified nanosilica particles themselves having high scratch resistance, the hydrophilic coating exhibits an excellent scratch resistance because the unmodified nanosilica particles are fixed to the base material by the (meth) acrylic resin. Furthermore, since the hydrophilic coating contains the (meth)acrylic resin in combination with the unmodified nanosilica particles, a decrease in hydrophilicity such as that which occurs in the deposited silica film under high temperature and high humidity conditions can be compensated by the hydrophilicity of the coexisting (meth) acrylic resin, and as a result, a reduction in the overall hydrophilicity of the hydrophilic coating can be suppressed.

A schematic cross-sectional view of a film according to one embodiment is illustrated in FIG. 1. A film 10 of FIG. 1 includes a base material 12 and a hydrophilic coating 14.

Materials that can be used for the base material include, but are not limited to, polycarbonate, poly(meth)acrylates (e.g., polymethyl methacrylate (PMMA)), polyolefins (e.g., polyethylene (PE) and polypropylene (PP)), polyurethane, polyester (e.g., polyethylene terephthalate (PET) and polyethylene naphthalate (PEN)), polyamides, polyimides, phenolic resins, cellulose diacetate, cellulose triacetate, polystyrene, styrene-acrylonitrile copolymers, acrylonitrile-butadiene-styrene copolymer (ABS), amorphous cycloolefin polymer (COP), epoxy resins, polyacetate, polyvinyl chloride, and glass.

Examples of the shape of the base material include films, plates, and film or plate-like laminates.

The base material may be transparent or colored transparent. A film including a transparent base material or a colored transparent base material enables the interior of the microfluidic device, e.g. the flow channel, to be visible through the film. In the present disclosure, "transparent" means that the total light transmittance in a wavelength range of from 400 to 700 nm is 90% or greater, and "colored transparent" refers to transparency in which the target object is visible through a colored base material, such as sunglasses for example, and in this case, the total light transmittance may be 90% or less. The total light transmittance is determined in accordance with JIS K 7361-1: 1997 (ISO 13468-1: 1996).

In one embodiment, the base material is a polyethylene terephthalate film or a cycloolefin polymer film and is preferably a polyethylene terephthalate film. Polyethylene terephthalate films and cycloolefin polymer films have excellent transparency and strength, and polyethylene terephthalate films in particular are inexpensive and easy to obtain.

The thickness of the base material in the case of a film shape may be set to approximately 5 μm or greater, approximately 10 μm or greater, or approximately 20 μm or greater, and approximately 500 μm or less, approximately 300 μm or less, or approximately 200 μm or less, and in the case of a plate-like shape, the thickness thereof may be set to approximately 0.5 mm or greater, approximately 0.8 mm or greater, or approximately 1 mm or greater, and approximately 10 mm or less, approximately 5 mm or less, or approximately 3 mm or less, but the thickness of the base material is not limited thereto. In one embodiment, the thickness of the base material is approximately 100 μm or less, approximately 80 μm or less, or approximately 50 μm or less. With this embodiment, microscopic observation of the microfluidic device interior, e.g. the flow channels, from the film side can be facilitated.

The (meth)acrylic resin functions as a hydrophilic binder for the unmodified nanosilica particles. The (meth)acrylic resin can increase the scratch resistance of the hydrophilic coating and the adhesiveness to the base material and can stabilize the hydrophilicity under high temperature and high humidity conditions. The (meth)acrylic resin can be obtained by polymerizing or copolymerizing a monomer mixture containing one or more monomers having an acrylic group or methacrylic group.

In one embodiment, the (meth)acrylic resin has at least one moiety selected from an ethylene oxide moiety and a propylene oxide moiety. The (meth)acrylic resin having an ethylene oxide moiety or a propylene oxide moiety can provide a hydrophilic coating having a high level of hydrophilicity and excelling in scratch resistance. Such (meth) acrylic resins can be obtained by polymerizing or copolymerizing polyalkylene glycol (meth)acrylate monomers such as polyethylene glycol (meth)acrylate, polyethylene glycol di(meth)acrylate, polyethylene glycol tri(meth)acrylate, polypropylene glycol (meth)acrylate, polypropylene glycol di(meth)acrylate, and polypropylene glycol tri(meth) acrylate; alkylene oxide modified or added (meth)acrylate monomers such as trimethylolpropane PO-modified triacrylate and glycerin PO-added triacrylate; or monomer mixtures of these. The polyalkylene glycol (meth)acrylate monomer may be used alone or as a mixture of two or more types. Various monomers having different chain lengths of ethylene glycol or propylene glycol can be used as the polyalkylene glycol (meth)acrylate monomer, and the hydrophilicity can be controlled by the chain length (n). For example, a polyalkylene glycol (meth)acrylate monomer having a chain length of not less than 1, preferably not less than 5, not less than 7, or not less than 10 and not greater than 100, not greater than 80, or not greater than 50 can be used as the polyalkylene glycol (meth)acrylate monomer.

The (meth)acrylic resin can be obtained by polymerizing or copolymerizing one or more polyfunctional polyalkylene glycol (meth)acrylate monomers such as polyethylene glycol di(meth)acrylate, polyethylene glycol tri(meth)acrylate, polypropylene glycol di(meth)acrylate, and polypropylene glycol tri(meth)acrylate; and one or more of monofunctional monomers, polyfunctional monomers other than the polyfunctional polyalkylene glycol (meth)acrylate monomers, or oligomers with or without hydrophilicity. When these monomers or oligomers are used in combination, the compounding ratio can be appropriately determined with consideration of the hydrophilicity, scratch resistance, and the like of the hydrophilic coating.

Monofunctional monomers are monomers having one ethylenically unsaturated bond. Examples of monofunctional monomers include, but are not limited to, alkyl (meth)acrylates such as ethyl (meth)acrylate and butyl (meth)acrylate; hydroxyl group-containing (meth)acrylic monomers such as 2-hydroxyethyl acrylate (HEA), 2-hydroxypropyl acrylate (HPA), and 2-hydroxyethyl methacrylate (HEMA); and styrene and vinyl toluene.

The polyfunctional monomers other than the polyfunctional polyalkylene glycol (meth)acrylate monomers are monomers having two or more ethylenically unsaturated bonds. Examples of the polyfunctional monomers include, but are not limited to, polyfunctional (meth)acrylate monomers, polyfunctional (meth)acrylic urethane monomers, and oligomers thereof.

The polyfunctional (meth)acrylate monomers are compounds having two or more (meth)acryloyloxy groups in one molecule. Examples of the polyfunctional (meth)acrylate monomers and oligomers thereof include, but are not limited to, tricyclodecane dimethylol diacrylate, trimethylolpropane triacrylate, trimethylolpropane trimethacrylate, ε-caprolactone-modified tris(acryloyloxyethyl) isocyanurate, pentaerythritol triacrylate, pentaerythritol tetraacrylate, di(trimethylolpropane)tetraacrylate, dipentaerythritol pentaacrylate, dipentaerythritol hexaacrylate, dendrimer acrylate, and oligomers thereof.

The polyfunctional (meth)acrylic urethane monomers are urethane compounds having two or more (meth)acrylic groups in one molecule. The polyfunctional (meth)acrylic urethane and oligomers thereof include, but are not limited to, e.g., phenylglycidyl ether acrylate hexamethylene diisocyanate urethane prepolymer; pentaerythritol triacrylate toluene diisocyanate urethane prepolymer, dipentaerythritol pentaacrylate hexamethylene diisocyanate urethane prepolymer and oligomers thereof.

The polymerization or copolymerization of the monomers or monomer mixtures is not limited to the following, but can be carried out, for example, by thermal polymerization or photopolymerization. Thermal polymerization is typically conducted using a thermal polymerization initiator. Examples of thermal polymerization initiators that can be used include, but are not limited to, hydrophilic thermal polymerization initiators such as potassium peroxodisulfate, ammonium peroxodisulfate, and other such peroxides; and VA-044, V-50, V-501, VA-057 (available from Fujifilm Wako Pure Chemical Corporation (Chuo-ku, Tokyo, Japan)) and other such azo compounds. Radical initiators having polyethylene oxide chains can also be used. As a polymerization accelerator, a tertiary amine compound such as N,N,N',N'-tetramethylethylenediamine and β-dimethylaminopropionitrile may be used.

Photopolymerization can be performed, for example, through radiation irradiation with, inter alia, electron beams or ultraviolet light. In a case where an electron beam is used, it is not necessary to use a photopolymerization initiator, but photopolymerization by ultraviolet light is generally performed using a photopolymerization initiator. Examples of photopolymerization initiators that can be used include, but are not limited to, water-soluble or hydrophilic photopolymerization initiators such as IRGACURE (trade name) 2959, DAROCUR (trade name) 1173, DAROCUR (trade name) 1116, and IRGACURE (trade name) 184 (available from BASF Japan, Minato-ku, Tokyo, Japan).

In one embodiment, the (meth)acrylic resin is included in the hydrophilic coating at an amount of approximately 5 mass % or greater, approximately 8 mass % or greater, or approximately 10 mass % or greater and approximately 30 mass % or less, approximately 25 mass % or less, or approximately 20 mass % or less, based on the total mass of the hydrophilic coating. By setting the content of the (meth) acrylic resin to be within the range described above, the adhesiveness of the hydrophilic coating to the base material is enhanced, the unmodified nanosilica particles can be sufficiently exposed at the hydrophilic coating surface, and the hydrophilicity and scratch resistance of the hydrophilic coating, and the bondability of the hydrophilic coating to the polydimethylsiloxane substrate can be enhanced.

The unmodified nanosilica particles contribute to the formation of a hydrophilic coating that has excellent hydrophilicity, scratch resistance, and bondability with polydimethylsiloxane. It is advantageous that the unmodified nanosilica particles are particles that can be dispersed in a state in which the particles do not aggregate in water, i.e., are water dispersible particles, and examples of the unmodified nanosilica particles that can be used include, but are not limited to, particles that are dispersed in water only by electrostatic repulsion of the particle surface based on pH adjustments. The type, content, and average particle size of the unmodified nanosilica particles can be appropriately determined with consideration of, inter alia, the hydrophilicity and scratch resistance of the hydrophilic coating, and the bondability of the hydrophilic coating to the polydimethylsiloxane substrate.

The unmodified nanosilica particles can be used in various forms, such as water dispersions (sols). Since the unmodified nanosilica particles have silanol groups on the surface thereof, the hydrophilicity of the hydrophilic coating can be more effectively increased. Examples of the unmodified nanosilica particles that can be used include NALCO (trade name) 2329K, 2327, and 2326 (available from Nalco Water, An Ecolab Company (Naperville, Illinois, USA)).

The unmodified nanosilica particles are included in the hydrophilic coating at an amount of approximately 65 mass % or greater and approximately 95 mass % or less, based on the total mass of the hydrophilic coating. In one embodiment, the unmodified nanosilica particles are included in the hydrophilic coating at an amount of approximately 65 mass % or greater, approximately 70 mass % or greater, or approximately 75 mass % or greater, and approximately 95 mass % or less, approximately 90 mass % or less, or approximately 85 mass % or less, based on the total mass of the hydrophilic coating. By setting the content of the unmodified nanosilica particles to be within the range described above, the unmodified nanosilica particles can be sufficiently exposed at the hydrophilic coating surface, and the hydrophilicity and scratch resistance of the hydrophilic coating, and the bondability of the hydrophilic coating to the polydimethylsiloxane substrate can be enhanced.

The average particle size of the unmodified nanosilica particles can be measured using techniques commonly used in the relevant technical field, including, for example, transmission electron microscopy (TEM). The procedures for measuring the average particle size of the unmodified nanosilica particles are, for example, as follows. A sol sample of unmodified nanosilica particles is dripped onto a 400 mesh copper TEM grid having an ultra-thin carbon base material on a top surface of a mesh lacey carbon (available from Ted Pella Inc. (Redding, California, USA)), and thereby a sol sample for TEM images is prepared. Some of the droplets are removed by causing the droplets to contact the sides or bottom of the grid as well as filter paper. The remaining the sol solvent is removed by heating or leaving at room temperature. Through this, particles are allowed to remain on the ultra-thin carbon base material and be imaged with minimal interference from the base material. Next, TEM images are recorded at many locations across the entire grid. Sufficient images are recorded so that the particle sizes of from 500 to 1000 particles can be measured. The average particle size of the unmodified nanosilica particles is then calculated based on the particle size measurements of each sample. TEM images can be obtained using a high resolution transmission electron microscope (under the product name "Hitachi H-9000", available from Hitachi High-Technologies Corporation (Minato-ku, Tokyo, Japan)) operating at 300 kV (and using a LaB6 source). The images can be recorded using a camera (e.g., under the product name "GATAN ULTRASCAN CCD", available from Gatan, Inc. (Pleasanton, California, USA), model number 895, 2 k×2 k chip). Images are captured at magnification rates of 50000 times and 100000 times, and images are further captured at a magnification rate of 300000 times depending on the average particle size of the unmodified nanosilica particles.

In one embodiment, the average particle size of the unmodified nanosilica particles is approximately 1 nm or greater, approximately 2 nm or greater, or approximately 3 nm or greater, and approximately 20 nm or less, approximately 15 nm or less, or approximately 10 nm or less. By using unmodified nanosilica particles having an average particle size within the range described above, the surface roughness of the hydrophilic coating can be reduced, and the bondability of the hydrophilic coating to the polydimethylsiloxane substrate can be enhanced.

The unmodified nanosilica particles may include two or more groups of particles of different average particle sizes. For example, in an embodiment in which the unmodified nanosilica particles include a group of small particles and a group of large particles, the average particle size of the group of small particles can be set to approximately 1 nm or greater, approximately 2 nm or greater, or approximately 3 nm or greater and approximately 20 nm or less, approximately 15 nm or less, or approximately 10 nm or less, and the average particle size of the group of large particles can be set to approximately 50 nm or greater, approximately 60 nm or greater, or approximately 70 nm or greater, and approximately 300 nm or less, approximately 250 nm or less, or approximately 200 nm or less. While not bound by any theory, it is believed that the unmodified nanosilica particles having a small particle size are filled between the unmodified nanosilica particles having a large particle size, and thereby, similar to a case in which only unmodified nanosilica particles having a small average particle size are used, the surface roughness of the hydrophilic coating can be reduced, and the bondability of the hydrophilic coating to the polydimethylsiloxane substrate can be increased. In addition, by using unmodified nanosilica particles including two or more groups of particles having different average particle sizes, the hydrophilic coating is filled with a large amount of unmodified nanosilica particles, and thereby the hydrophilicity and scratch resistance of the hydrophilic coating, or bondability of the hydrophilic coating to the polydimethylsiloxane substrate is increased.

The particle size distribution of the unmodified nanosilica particles may exhibit a bimodal property with peaks occurring for the average particle size of the group of small particles and the average particle size of the group of large particles, or a multimodal property with peaks occurring for the average particle sizes of even more groups of particles. In one embodiment, the ratio of the average particle size of unmodified nanosilica particles having an average particle size in the range from approximately 1 nm to approximately 20 nm to the average particle size of unmodified nanosilica particles having an average particle size in the range from approximately 50 nm to approximately 300 nm is from 0.01:1 to 200:1, from 0.05:1 to 100:1, or from 0.1:1 to 100:1. Combinations of average particle sizes of two or more particle groups include, for example, 5 nm/75 nm, 5 nm/20 nm, 20 nm/75 nm, and 5 nm/20 nm/75 nm.

The mass ratio (%) of each group of the two or more particle groups can be selected according to the particle size of the unmodified nanosilica particles that are used or combinations thereof. Suitable mass ratios can be selected in accordance with the particle size or combinations thereof using a software (available under the product name "CALVOLD 2"), and for example, a suitable mass ratio can be selected based on a simulation between the filling rate and mass ratio of the group of small particles and the group of large particles with regard to combinations of particle sizes (the group of small particles/the group of large particles) (refer to M. Suzuki and T. Oshima, "Verification of a model for estimating the void fraction in a three-component randomly packed bed", Powder Technol., 43, 147-153 (1985)).

The hydrophilic coating may include modified nanosilica particles at an amount of approximately 10 mass % or less, preferably approximately 5 mass % or less, and more preferably approximately 1 mass % or less, based on the total mass of the hydrophilic coating. More preferably, the hydrophilic coating does not contain modified nanosilica particles.

The hydrophilic coating may further contain, as necessary, additives such as silane coupling agents, ultraviolet absorbers, leveling agents, antistatic agents, and dyes in a range that does not cause problems in performance such as hydrophilicity, scratch resistance, and bondability with polydimethylsiloxane.

In one embodiment, the hydrophilic coating contains a silane coupling agent. Examples of silane coupling agents include, but are not limited to, vinyl-modified alkoxysilanes, (meth)acrylic-modified alkoxysilanes, amino-modified alkoxysilanes, glycidyl-modified alkoxysilanes, and other such epoxy-modified alkoxysilanes, polyether-modified alkoxysilanes, and zwitterionic alkoxysilanes. When the silane coupling agent is blended into the hydrophilic coating, the unmodified nanosilica particles and the (meth) acrylic resin can be bonded, and therefore shedding of the unmodified nanosilica particles from the hydrophilic coating can be effectively prevented. The use of a silane coupling agent also contributes to improving interlayer adhesiveness between the base material and the hydrophilic coating when an inorganic base material such as glass is used. The silane coupling agent having an ethylenically unsaturated group such as a vinyl group or a (meth)acrylic group also functions as a hydrophilic binder in the same manner as the (meth) acrylic resin.

The silane coupling agent can be used in a range of approximately 0.01 mass % or greater, approximately 0.05 mass % or greater, or approximately 0.1 mass % or greater, and approximately 2 mass % or less, approximately 1 mass % or less, or approximately 0.5 mass % or less, based on the total mass of the hydrophilic coating.

In some cases, hydrophilicity-imparting components that elute with regard to water, such as surfactants and anti-fogging agents, may bleed onto the hydrophilic coating surface and thereby reduce the scratch resistance of the hydrophilic coating and the bondability with the polydimethylsiloxane substrate. In one embodiment, the hydrophilic coating contains a hydrophilicity-imparting component that elutes with respect to water, at an amount of approximately 1.0 mass % or less, approximately 0.5 mass % or less, or approximately 0.01 mass % or less, relative to the total mass of the hydrophilic coating. Preferably, the hydrophilic coating does not include a hydrophilicity-imparting component.

The film can be manufactured, for example, by a method that includes: applying a coating agent containing unmodified nanosilica particles, a (meth)acrylic resin, water, a water-soluble organic solvent, and optional additives, onto a base material optionally having a primer layer or surface treatment and drying to form an uncured hydrophilic coating; and curing the uncured hydrophilic coating. In the present disclosure, a "water-soluble organic solvent" means an organic solvent that is uniformly mixed with water without phase separation. The solubility parameter (SP) value of the water soluble organic solvent is, for example, approximately 9.3 or greater, or approximately 10.2 or greater, and less than approximately 23.4.

The coating agent can be obtained, for example, by mixing a sol of unmodified nanosilica particles with a (meth)acrylic resin and optional additives in a solvent together with a reaction initiator and adjusting to the desired solid content by further adding solvent as necessary. Examples of the reaction initiator that can be used include the above-mentioned photopolymerization initiators or thermal polymerization initiators.

While not bound by any theory, it is believed that the unmodified nanosilica particles are dispersed in the sol solely by electrostatic repulsion between the particles. Therefore, it may be difficult to uniformly disperse the unmodified nanosilica particles in a coating agent containing a (meth)acrylic resin or the like. In a case where a coating agent with insufficient dispersion of the unmodified nanosilica particles is used, the unmodified nanosilica particles aggregate, resulting in an increase in the particle size of the secondary particles, and therefore the transparency and hydrophilicity of the obtained hydrophilic coating, the smoothness of the hydrophilic coating surface, and the like may be reduced in some cases. To prevent or suppress these issues, the unmodified nanosilica particles can be uniformly dispersed in the coating agent by appropriately selecting the solvent when preparing the coating agent. A mixed solvent of water and a water-soluble organic solvent can be used as the solvent. The amount of water in the coating agent can be approximately 30 mass % or greater, approximately 35 mass % or greater, or approximately 40 mass % or greater, and approximately 80 mass % or less, approximately 70 mass % or less, or approximately 60 mass % or less, based on the total mass of the coating agent. Examples of the water-soluble organic solvent include alcohols such as methanol, ethanol, isopropanol, 1-methoxy-2-propanol, and the like. The use of an organic solvent in which 1-methoxy-2-propanol and at least one or more of methanol, ethanol, or isopropanol are mixed is advantageous. The mass ratio of water to the water soluble organic solvent can be set from 30:70 to 80:20, from 35:65 to 70:30, and from 40:60 to 60:40. The mass ratio of 1-methoxy-2-propanol to at least one or more of methanol, ethanol or isopropanol in a water soluble organic solvent can be set from 95:5 to 40:60, from 90:10 to 50:50, or from 80:20 to 60:40.

Techniques for applying the coating agent to the surface of the base material include, for example, bar coating, dip coating, spin coating, capillary coating, spray coating, gravure coating, and screen printing. The applied coating can be dried as needed and cured by heating or irradiation with radiation such as ultraviolet light or electron beams. In this way, a hydrophilic coating can be formed on the base material to produce a film for a microfluidic device.

The thickness of the hydrophilic coating can be set, for example, to approximately 0.05 μm or greater, approximately 0.1 μm or greater, or approximately 0.5 μm or greater, and approximately 10 μm or less, approximately 8 μm or less, or approximately 5 μm or less.

The hydrophilic coating can be applied to one or both sides of the base material. A micro flow channel device having a three-dimensional flow channel can be produced by disposing a film including the hydrophilic coating on both sides of the base material between two polydimethylsiloxane substrates.

To improve the adhesiveness between the hydrophilic coating and the base material, the base material surface may be surface treated, and a primer layer may be applied onto the base material surface.

Examples of surface treatments include plasma treatment, corona discharge treatment, flame treatment, electron beam irradiation, roughening, ozone treatment, and chemical oxidation treatment using chromic acid or sulfuric acid.

Examples of the material of the primer layer include (meth)acrylic resins such as homopolymers of (meth)acrylate, copolymers of two or more types of (meth)acrylates, or copolymers of (meth)acrylate and other polymerizable monomers; urethane resins such as two-pack curable urethane resins including polyols and isocyanate curing agents; (meth)acrylic-urethane copolymers such as acrylic-urethane block copolymers; polyester resins; butyral resins; vinyl chloride-vinyl acetate copolymers; ethylene-vinyl acetate copolymers; chlorinated polyolefins such as chlorinated polyethylene and chlorinated polypropylene; and copolymers and derivatives thereof (e.g., chlorinated ethylene-propylene copolymers, chlorinated ethylene-vinyl acetate copolymers, (meth) acrylic-modified chlorinated polypropylene, maleic anhydride-modified chlorinated polypropylene, and urethane-modified chlorinated polypropylene).

The primer layer can be formed by using, for example, bar coating, dip coating, spin coating, capillary coating, spray coating, gravure coating, or screen printing to coat the base material with a primer solution in which the above-mentioned materials are dissolved in a solvent, and then drying, and as necessary, heating or irradiating with radiation. The thickness of the primer layer can be set to approximately 0.1

μm or greater, or approximately 0.5 μm or greater, and approximately 20 μm or less, or approximately 5 μm or less. A base material provided with a primer layer can also be used. Examples of materials that can be used as such a base material include LUMIRROR (trade name) U32 (available from Toray Industries, Inc. (Chuo-ku, Tokyo, Japan)), and COSMOSHINE (trade name) A4100 and A4300 (available from Toyobo Co., Ltd. (Osaka-shi, Osaka, Japan)).

The film for a microfluidic device may be sheet-shaped or a roll body. In one embodiment, blocking does not occur between the hydrophilic coating surface and the base material surface or between the hydrophilic coating surfaces themselves when a plurality of sheets of the film for a microfluidic device are stacked or the film for a microfluidic device is formed in a roll body.

The film for a microfluidic device may include, for example, a colored layer, a decorative layer, an electrically conductive layer, an adhesive layer, a tacky adhesive layer, or the like, as necessary, between the hydrophilic coating and the base material, or on the base material surface on the side opposite to the hydrophilic coating.

In one embodiment, the surface roughness of the hydrophilic coating is approximately 3 nm or less, approximately 2.5 nm or less, or approximately 2 nm or less. The surface roughness of the hydrophilic coating can be measured as an arithmetic mean roughness Ra in a tapping mode using an atomic force microscope (AFM). With the surface roughness of the hydrophilic coating set to 3 nm or less, the bonding strength can be increased by bringing the hydrophilic coating and the polydimethylsiloxane substrate into close proximity at a molecular level distance to thereby promote chemical interaction, for example the occurrence of covalent or ionic bonding. The surface roughness of the hydrophilic coating can be obtained, for example, by filling, at a high level, the hydrophilic coating with unmodified nanosilica particles having a small average particle size, for example, unmodified nanosilica particles having an average particle size of from 1 to 10 nm. The surface roughness can also be obtained using unmodified nanosilica particles including two or more groups of particles having different average particle sizes. In one embodiment, the hydrophilic coating has a surface roughness of approximately 0.1 nm or greater, approximately 0.2 nm or greater, or approximately 0.5 nm or greater.

Hydrophilicity of the hydrophilic coating can be expressed, for example, by a water contact angle. In one embodiment, the initial water contact angle of the hydrophilic coating is approximately 30 degrees or less, approximately 20 degrees or less, or approximately 15 degrees or less. A film having hydrophilicity that is suitable for a microfluidic device can be provided by setting the initial water contact angle of the hydrophilic coating to be within the above-described range. In one embodiment, the initial water contact angle of the hydrophilic coating is approximately 1 degree or greater, approximately 2 degrees or greater, or approximately 5 degrees or greater.

In one embodiment, the water contact angle of the hydrophilic coating after the film has been left for 30 days at 40° C. and 75% relative humidity is approximately 30 degrees or less, approximately 20 degrees or less, or approximately 15 degrees or less. By configuring so that the water contact angle of the hydrophilic coating after aging under high temperature and high humidity conditions is within the range described above, a film having excellent storage stability can be provided, and the performance of the microfluidic device can be guaranteed for a long period of time. In one embodiment, the water contact angle of the hydrophilic coating aged under the above-mentioned conditions is approximately 1 degree or greater, approximately 2 degrees or greater, or approximately 5 degrees or greater.

In one embodiment, the unmodified nanosilica particles are uniformly dispersed in the hydrophilic coating without agglomerating into larger secondary particles, and the hydrophilic coating has a high level of transparency, or in other words, a low haze value. For example, the initial haze value of the hydrophilic coating is approximately 20% or less, approximately 15% or less, or approximately 10% or less. When a hydrophilic coating is applied at a thickness of 1.5 μm onto one side of a transparent base material such as a typical optical film, for example, a 50 μm thick COSMOSHINE (trade name) A4100 film (available from Toyobo Co., Ltd. (Osaka-shi, Osaka, Japan)), the initial haze value of the resulting film can be set to approximately 5% or less, approximately 3% or less, or approximately 1% or less.

The scratch resistance of the hydrophilic coating can be represented by the change in the haze value before and after a steel wool abrasion resistance test, for example. In one embodiment, a Δ haze value ((haze value after 10 cycles)−(initial haze value)), which is a value obtained by subtracting the initial haze value (%) from a haze value (%) after subjecting the hydrophilic coating to 10 cycles of steel wool abrasion resistance tests using #0000 steel wool and a 350 g weight, is approximately −1.5% or greater, approximately −1.2% or greater, or approximately −1% or greater, and approximately 1.5% or less, approximately 1.2% or less, or approximately 1% or less. Films Including hydrophilic coatings with the above-mentioned Δ haze values have high scratch resistance and can enhance handling ease during manufacture and use of the microfluidic device. In one embodiment, when a hydrophilic coating is applied at a thickness of 1.5 μm onto one side of a transparent base material such as a typical optical film, for example, a 50 μm thick COSMOSHINE (trade name) A4100 film (available from Toyobo Co., Ltd. (Osaka-shi, Osaka, Japan)), the A haze value of the resulting film can be set to approximately −1.5% or greater, approximately −1.2% or greater, or approximately −1% or greater, and approximately 1.5% or less, approximately 1.2% or less, or approximately 1% or less.

A microfluidic device can be fabricated using the film for a microfluidic device. A method for manufacturing a microfluidic device according to one embodiment includes: preparing a polydimethylsiloxane substrate having flow channels formed in a surface thereof; preparing the above-mentioned film; activating the surface of the polydimethylsiloxane substrate in which the flow channels are formed and the hydrophilic coating of the film; and bonding the polydimethylsiloxane substrate and the film such that the surface of the polydimethylsiloxane substrate in which the flow channels are formed faces the hydrophilic coating of the film, thereby forming liquid-tight flow channels within a microfluidic device. In one embodiment, the bonding between the polydimethylsiloxane substrate and the film is performed by pressing the polydimethylsiloxane substrate and the film.

Prior to bonding the polydimethylsiloxane substrate to the film, the polydimethylsiloxane substrate may be cleaned by, inter alia, ultrasonic cleaning or acid and alkali cleaning.

Activation of the surface of the polydimethylsiloxane substrate in which the flow channels are formed and the hydrophilic coating of the film can be implemented by, inter alia, exposure to oxygen plasma in a plasma device, such as a reactive ion etching (RIE) device, or by irradiation with excimer UV light or ion beams. Through activation, organic substances and the like that are adhered to the surfaces of the polydimethylsiloxane substrate and the hydrophilic coating can be decomposed and removed to produce highly reactive substituents such as radicals, hydroxyl groups, carboxyl groups, and aldehyde groups on these surfaces. Activation can be carried out, for example, until the water contact angles at the surfaces of the polydimethylsiloxane substrate and the hydrophilic coating become approximately 30 degrees or less or approximately 15 degrees or less.

In one embodiment, activation of the surface of the polydimethylsiloxane substrate in which the flow channels are formed and the hydrophilic coating of the film is performed by exposure to oxygen plasma.

After the polydimethylsiloxane substrate and the film are bonded, the polydimethylsiloxane substrate or the film or both may be subjected to machining, including, inter alia, the formation of openings.

In one embodiment, the present invention provides a microfluidic device that includes a polydimethylsiloxane substrate having flow channels formed in a surface thereof, and the above-mentioned film, wherein the polydimethylsiloxane substrate and the film are bonded so that the surface of the polydimethylsiloxane substrate in which the flow channels are formed faces the hydrophilic coating of the film, and liquid-tight flow channels are provided internally. In the microfluidic device of this embodiment, the polydimethylsiloxane substrate and the film are bonded via the hydrophilic coating, and another adhesive is not interposed. Therefore, a higher level of hydrophilicity can be imparted to the flow channel surface of the microfluidic device compared to when another adhesive is used.

The films for a microfluidic device can be used in the manufacture of microfluidic devices for use in, for example, applications such as bodily fluid diagnostics, drug testing, and water quality examinations.

EXAMPLES

Specific embodiments of the present disclosure are presented in the following examples, but the present invention is not limited to these embodiments. Unless otherwise specified, all parts and percentages are based on mass.

The reagents and materials used in the examples are shown in Table 1.

TABLE 1

| Product Name, Model Number or Abbreviation | Description | Provider |
|---|---|---|
| NALCO (trade name) 2329K | Average particle size 75 nm, unmodified nanosilica particles (sol), solid content: 41.0 mass % | Nalco Water, An Ecolab Company (Naperville, Illinois, USA) |
| NALCO (trade name) 2327 | Average particle size 20 nm, unmodified nanosilica particles (sol), solid content: 43.7 mass % | Nalco Water, An Ecolab Company (Naperville, Illinois, USA) |
| NALCO (trade name) 2326 | Average particle size 5 nm, unmodified nanosilica particles (sol), solid content: 16.4 mass % | Nalco Water, An Ecolab Company (Naperville, Illinois, USA) |
| SILQUEST (trade name) A-174 | Silane coupling agent: 3-methacryloxypropyl trimethoxysilane | Momentive Performance Materials Japan LLC (Minato-ku, Tokyo, Japan) |
| PROSTAB (trade name) | 4-hydroxy-2,2,6,6-tetramethylpiperidin-1-oxyl | BASF Japan Ltd. (Minato-ku, Tokyo, Japan) |
| EBECRYL (trade name) 11 | Polyethylene glycol diacrylate | Daicel-Allnex Ltd. (Chuo-ku, Tokyo, Japan) |
| SAC | Silane coupling agent | 3M Company (Saint Paul, Minnesota, USA) |
| Irgacure (trade name) 2959 | 1-[4-(2-hydroxyethoxy)-phenyl]-2-hydroxy-2-methyl-1-propan-1-one | BASF Japan Ltd. (Minato-ku, Tokyo, Japan) |
| EtOH | Ethanol | Fujifilm Wako Pure Chemical Corp. (Osaka-shi, Osaka, Japan) |
| MIPA | 1-methoxy-2-propanol | Sigma-Aldrich Japan K.K. (Meguro-ku, Tokyo, Japan) |
| IPA | 2-propanol | Sigma-Aldrich Japan K.K. (Meguro-ku, Tokyo, Japan) |
| Cosmoshine (trade name) A4100 | 50 μm thick PET film, single-sided adhesion-improvement treated product | Toyobo Co., Ltd. (Osaka-shi, Osaka, Japan) |

Preparation of SAC

A silane coupling agent SAC was prepared by the method described in Preparative Example 7 in U.S. 2015/0,203,708 (Klun et al.).

Preparation of Modified Silica Sol (Modified Sol A)

A modified silica sol ("modified sol A") was prepared in the following manner. 25.25 g of SILQUEST (trade name) A-174 and 0.5 g of PROSTAB (trade name) were added to a mixture of 400 g of NALCO (trade name) 2326 and 450 g of MIPA in a glass vial and stirred at room temperature for 10 minutes. The glass vial was sealed and placed in an oven at 80° C. for 16 hours. Water was removed from the resulting solution with a rotary evaporator until the solid content of the solution was approximately 45 mass % at 60° C. The resulting solution was charged with 200 g of MIPA, and the remaining water was removed using the rotary evaporator at 60° C. The latter step was repeated twice to further remove water from the solution. Finally, the concentration of the nanosilica particles was adjusted to 48.4 mass % by adding MIPA, and a modified silica sol (hereinafter referred to as the modified sol A) containing acrylic-modified nanosilica particles having an average particle size of 5 nm was obtained.

Preparation of Coating Agent C-1

3.903 g of NALCO (trade name) 2329K, 0.392 g of EBECRYL (trade name) 11 and 0.008 g of SAC were mixed.

Subsequently, 0.06 g of IRGACURE (trade name) 2959 was added to the mixture as a photopolymerization initiator. Next, 1.6 g of IPA, 2.4 g of MIPA and 1.697 g distilled water were added to the mixture to adjust the solid content to 20.48 mass %, and a coating agent C-1 containing, on a basis of solids, 80 mass % of unmodified nanosilica particles with an average particle size of 75 nm was prepared.

Preparation of Coating Agents C-2 to C-8

Coating agents 2 to 8 were prepared with the same procedures used to obtain the coating agent 1 with the exception that the formulations were changed to those shown in Table 2. The average particle size of the unmodified nanosilica particles and contents thereof (solids basis) are shown in Table 2.

Preparation of Coating Agent C-A Containing Modified Sol A 1.778 g of the modified sol A, 0.196 g of EBECRYL (trade name) 11, and 0.004 g of SAC were mixed. Subsequently, 0.03 g of IRGACURE (trade name) 2959 was added to the mixture as a photopolymerization initiator. Next, 1.8 g of EtOH and 6.222 g of MIPA were added to the mixture to adjust the solid content to 10.27 mass %, and a coating agent C-A containing, on a basis of solids, 80 mass % of acrylic-modified nanosilica particles with an average particle size of 5 nm was prepared.

The compositions of the prepared coating agents are shown in Table 2. All compounded amounts are in grams.

cured. In this manner, a film including a coating with a thickness of 1.5 μm was produced.

Example 1

A film with a coating was produced in the same manner as in Comparative Example 1 with the exception that the coating agent C-1 was substituted with the coating agent C-2.

Examples 2 to 4 and Comparative Examples 2 to 5

Films with a coating were produced in the same manner as in Comparative Example 1 with the exception that the coating agent C-1 was substituted with the respective coating agents described in Table 3, and the Meyer rod that was used was substituted with a #20 Meyer rod.

Comparative Example 6

A silica deposition film was deposited on an adhesion-improvement treated surface of COSMOSHINE (trade name) A4100 under conditions of a ultimate pressure of $2.36\times10^{-4}$ Pa, an RF output (plasma power supply output) of 400 W, and room temperature using an ion plating apparatus available from Showa Shinku Co., Ltd. (Sagamihara-shi, Kanagawa-ken, Japan), Si as an evaporation material, and oxygen as a reaction gas, and a film including a coating with a thickness of 120 nm was produced.

TABLE 2

| Components | | C-1 | C-2 | C-3 | C-4 | C-5 | C-6 | C-7 | C-8 | C-A |
|---|---|---|---|---|---|---|---|---|---|---|
| Unmodified nanosilica particles | NALCO (trade name) 2329K | 3.903 | — | — | — | — | — | — | — | — |
| | NALCO (trade name) 2327 | — | 3.661 | — | — | — | — | — | — | — |
| | NALCO (trade name) 2326 | — | — | 1.220 | 2.441 | 3.661 | 4.271 | 4.881 | 5.491 | — |
| Acrylic-modified nanosilica particles | Modified sol A | — | — | — | — | — | — | — | — | 1.778 |
| (Meth)acrylic resin | EBECRYL (trade name) 11 | 0.392 | 0.392 | 0.784 | 0.588 | 0.392 | 0.294 | 0.196 | 0.098 | 0.196 |
| | Irgacure (trade name) 2959 | 0.060 | 0.060 | 0.030 | 0.030 | 0.030 | 0.030 | 0.030 | 0.030 | 0.030 |
| Silane coupling agent | SAC | 0.008 | 0.008 | 0.016 | 0.012 | 0.008 | 0.006 | 0.004 | 0.002 | 0.004 |
| Diluent | EtOH | 1.600 | 1.600 | 1.800 | 1.800 | 1.800 | 1.800 | 1.800 | 1.800 | 1.800 |
| | MIPA | 2.400 | 2.400 | 2.700 | 2.700 | 2.700 | 2.700 | 2.700 | 2.700 | 6.222 |
| | Distilled water | 1.697 | 1.939 | 3.480 | 2.459 | 1.439 | 0.929 | 0.419 | 0 | 0 |
| Solid content (mass %) | | 20.48 | 20.48 | 10.27 | 10.27 | 10.27 | 10.27 | 10.27 | 10.18 | 10.27 |

Production of Film

Films with a coating were produced by the following procedures.

Comparative Example 1

The coating agent C-1 was applied to an adhesion-improvement treated surface of a 50 μm thick COSMOSHINE (trade name) A4100 as a base material using a #8 Meyer rod and then dried for 5 minutes at 60° C. The base material to which the coating was applied was then irradiated twice with ultraviolet rays (UV-A) under conditions of illuminance of 700 $mW/cm^2$ and a cumulative light amount of 900 $mJ/cm^2$ using an ultraviolet irradiation device (H-bulb (DRS model), available from Fusion UV Systems Inc.) in a nitrogen atmosphere, and the coating was thereby Water Contact Angle The water contact angle of the coating surface of the film was measured through the Sessile Drop method using a contact angle meter (DROPMASTER FACE, available from Kyowa Interface Science Co., Ltd. (Niiza-shi, Saitama-ken, Japan). In an environment with a temperature of 25° C., 2 μL of water was dripped onto the coating surface, after which the water contact angle was determined from an optical microscope image. The average value measured five times was taken as the water contact angle. A water contact angle of less than 20 degrees was evaluated as being excellent, a water contact angle of from 20 to 30 degrees was evaluated as being good, and a water contact angle exceeding 30 degrees was evaluated as being poor.

Surface Roughness (Arithmetic Mean Roughness Ra)

The arithmetic mean roughness Ra of the coating surface of the film was evaluated. The film was set on a CYPHER S AFM available from Oxford Instruments Co., Ltd. (Shinagawa-ku, Tokyo, Japan), and the coating surface was measured in tapping mode.

The scratch resistance of the coating was evaluated based on the change in haze value before and after a steel wool abrasion resistance test. Prior to the steel wool abrasion resistance test, the initial haze value of the coating was measured using an NDH-5000W (available from Nippon Denshoku Industries Co., Ltd. (Bunkyo-ku, Tokyo, Japan)) in accordance with JIS K 7136:2000. Subsequently, the coating surface was polished 10 times (cycles) at a speed of 60 cycles/minute with a 350 g load and 85 mm strokes using a 27 mm square #0000 steel wool in a steel wool abrasion resistance tester (rubbing tester IMC-157 C available from Imoto Machinery Co., Ltd. (Kyoto-shi, Kyoto, Japan)). After the sample surface was polished, the haze value of the coating was measured again, and the change in haze (haze increase) after the abrasion resistance test was calculated as A haze value (%)=(haze value (%) after abrasion resistance test)−(initial haze value (%)).

Polydimethylsiloxane (PDMS) Substrate Bondability

After the contact angle was measured, the surface of the film and the PDMS substrate were each wiped with IPA. The PDMS substrate and the film were each subjected to a plasma treatment. The PDMS substrate was placed on the film, a weight was placed on the PDMS substrate to apply a pressure of 200 g/16 $cm^2$, and this state was maintained at 80° C. for 30 minutes. A case of adhesion over the entire surface and the occurrence of cohesive failure of the PDMS substrate when the film was detached was evaluated as being good, a case of partial adhesion and the occurrence of cohesive failure of the PDMS substrate at the adhered portion when the film was peeled was evaluated as being acceptable, and a case of no adhesion was evaluated as being poor.

The coating composition and the evaluation results of the film are shown in Table 3.

TABLE 3

| | Comparative Example 1 | Example 1 | Comparative Example 2 | Comparative Example 3 | Comparative Example 4 |
|---|---|---|---|---|---|
| Coating agent | C-1 | C-2 | C-3 | C-4 | C-5 |
| Nanosilica particle average particle diameter (nm) | 75 | 20 | 5 | 5 | 5 |
| Nanosilica particle content (mass %) | 78 | 78 | 19 | 39 | 58 |
| (Meth)acrylic resin content (mass %) | 19 | 19 | 76 | 57 | 38 |
| Presence/absence of nanosilica particle modification | Unmodified | Unmodified | Unmodified | Unmodified | Unmodified |
| Water contact angle (degrees) | 15.75 | 15.29 | 36.12 | 42.55 | 36.95 |
| Surface roughness (nm) | 13.20 | 2.84 | 24.50 | 8.09 | 2.00 |
| Δ Haze value (%) | 1.66 | 1.01 | 13.30 | 7.50 | 14.08 |
| PDMS substrate bondability | Unacceptable | Acceptable | Unacceptable | Unacceptable | Unacceptable |

| | Example 2 | Example 3 | Example 4 | Comparative Example 5 | Comparative Example 6 |
|---|---|---|---|---|---|
| Coating agent | C-6 | C-7 | C-8 | C-A | Silica deposition film |
| Nanosilica particle average particle diameter (nm) | 5 | 5 | 5 | 5 | — |
| Nanosilica particle content (mass %) | 68 | 78 | 87 | 79 | — |
| (Meth)acrylic resin content (mass %) | 29 | 19 | 10 | 18 | — |
| Presence/absence of nanosilica particle modification | Unmodified | Unmodified | Unmodified | Acrylic Modification | — |
| Water contact angle (degrees) | 28.18 | 16.42 | 12.86 | 65.94 | 9.90 |
| Surface roughness (nm) | 0.63 | 0.90 | 0.70 | 3.01 | 13.60 |
| Δ Haze value (%) | NA | 0.80 | NA | NA | 4.25 |
| PDMS substrate bondability | Good | Good | Good | Good | Good |

When the films of Example 3 and Comparative Example 6 were stored for 30 days at 40° C. and a relative humidity of 75%, the contact angle of the film of Example 3 changed from 16.42 degrees to 19.10 degrees but was still not greater than 20 degrees. On the other hand, the contact angle of the film of Comparative Example 6 changed from 9.90 to 42.82 degrees.

Various modifications of the embodiments and examples described above may be made without departing from the basic principles of the present invention. It will also be obvious to a person skilled in the art that various improvements and modifications of the present invention may be made without departing from the spirit and scope of the present invention.

The invention claimed is:

1. A film for a microfluidic device, comprising:

a base material; and a hydrophilic coating;

wherein the hydrophilic coating comprises a (meth) acrylic resin and from 65 to 95 mass % of unmodified nanosilica particles based on a total mass of the hydrophilic coating, the unmodified nanosilica particles being non-agglomerated in the (meth)acrylic resin.

2. The film according to claim 1, wherein an initial water contact angle of the hydrophilic coating is 30 degrees or less.

3. The film according to claim 1, wherein the hydrophilic coating has a water contact angle of 30 degrees or less when the film is left for 30 days at 40° C. and a relative humidity of 75%.

4. The film according to claim 1, wherein the hydrophilic coating has a surface roughness of 3 nm or less.

5. The film according to claim 1, wherein a Δhaze value of the hydrophilic coating is from −1.5% to 1.5%, and the Δhaze value is a value obtained by subtracting an initial haze value (%) from a haze value (%) after 10 cycles of a steel wool abrasion resistance test using a #0000 steel wool and a weight of 350 g.

6. The film according to claim 1, wherein the (meth) acrylic resin has at least one moiety selected from the group consisting of an ethylene oxide moiety and a propylene oxide moiety.

7. The film according to claim 1, wherein the hydrophilic coating further comprises a silane coupling agent.

8. The film according to claim 1, wherein the hydrophilic coating has a thickness of 0.05 μm to 10 μm.

9. The film according to claim 1, wherein the base material is a polyethylene terephthalate film.

10. The film according to claim 1, wherein the base material is transparent.

11. A microfluidic device comprising:

a polydimethylsiloxane substrate having flow channels formed in a surface thereof; and the film of claim 1 covering the flow channels;

wherein the polydimethylsiloxane substrate and the film are bonded such that the surface of the polydimethylsiloxane substrate in which the flow channels are formed faces the hydrophilic coating of the film, and liquid-tight flow channels are provided internally once the polydimethylsiloxane substrate and the film are bonded.

12. A method for manufacturing a microfluidic device, the method comprising:

preparing a polydimethylsiloxane substrate having flow channels formed in a surface thereof;

preparing the film described in claim 1;

activating the surface of the polydimethylsiloxane substrate in which the flow channels are formed and the hydrophilic coating of the film; and bonding the polydimethylsiloxane substrate and the film such that the surface of the polydimethylsiloxane substrate in which the flow channels are formed faces the hydrophilic coating of the film, thereby forming liquid-tight flow channels within the microfluidic device.

13. The method according to claim 12, wherein the activation is carried out by exposure to oxygen plasma.

14. The film according to claim 6, wherein the (meth) acrylic resin is a di(meth)acrylate or a tri(meth)acrylate.

15. The film according to claim 7, wherein the silane coupling agent has an ethylenically unsaturated group.

16. The microfluidic device according to claim 11, wherein the (meth)acrylic resin has at least one moiety selected from the group consisting of an ethylene oxide moiety and a propylene oxide moiety.

17. The microfluidic device according to claim 16, wherein the (meth)acrylic resin is a di(meth)acrylate or a tri(meth)acrylate.

18. The microfluidic device according to claim 11, wherein the hydrophilic coating further comprises a silane coupling agent.

19. The microfluidic device according to claim 18, wherein the silane coupling agent has an ethylenically unsaturated group.

* * * * *